(12) United States Patent
Li et al.

(10) Patent No.: US 10,931,800 B2
(45) Date of Patent: Feb. 23, 2021

(54) METHOD FOR MANUFACTURING HOUSING AND MOBILE TERMINAL

(71) Applicant: Guangdong OPPO Mobile Telecommunications Corp., Ltd., Guangdong (CN)

(72) Inventors: Jing Li, Guangdong (CN); Guangming Yang, Guangdong (CN); Qingguo Gong, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/513,098

(22) Filed: Jul. 16, 2019

(65) Prior Publication Data

US 2019/0342431 A1 Nov. 7, 2019

Related U.S. Application Data

(63) Continuation-in-part of application No. PCT/CN2018/072427, filed on Jan. 12, 2018.

(30) Foreign Application Priority Data

Jan. 17, 2017 (CN) .......................... 201710031376.2

(51) Int. Cl.
*H04M 1/02* (2006.01)
*B29C 45/14* (2006.01)
(Continued)

(52) U.S. Cl.
CPC ....... *H04M 1/0202* (2013.01); *B29C 45/1418* (2013.01); *B29C 45/14467* (2013.01);
(Continued)

(58) Field of Classification Search
CPC .......... H04W 88/00–06; H04W 92/08; H04W 92/18; B29C 2045/14868
See application file for complete search history.

(56) References Cited

U.S. PATENT DOCUMENTS

2009/0280296 A1 11/2009 Naritomi et al.
2011/0254742 A1 10/2011 Ma
(Continued)

FOREIGN PATENT DOCUMENTS

CN 101313087 A 11/2008
CN 102480880 A 5/2012
(Continued)

OTHER PUBLICATIONS

Third Office Action from China patent office in a counterpart Chinese patent Application 201710031376.2, dated Nov. 9, 2019 (10 pages).
(Continued)

*Primary Examiner* — San Htun

(57) ABSTRACT

A method for manufacturing a housing is disclosed. The method includes: roughening a first surface of the housing; placing the housing into a mold and performing an injection molding to form a plastic layer on the first surface and closely bonded to the housing; and defining a plurality of slots by cutting through the housing by means of milling without milling a part or all of the plastic layer, wherein the plastic layer is configured to keep a connecting portion between adjacent slots defined in the housing undeformed during the milling. A mobile terminal is also disclosed.

14 Claims, 3 Drawing Sheets

(51) Int. Cl.
  *H01Q 1/24* (2006.01)
  *H01Q 13/10* (2006.01)
(52) U.S. Cl.
  CPC .......... *H01Q 1/244* (2013.01); *H01Q 13/10* (2013.01); *B29C 2045/14868* (2013.01)

(56) References Cited

U.S. PATENT DOCUMENTS

| | | | | |
|---|---|---|---|---|
| 2014/0284096 | A1* | 9/2014 | Wu | H05K 5/0004 174/520 |
| 2016/0114563 | A1* | 4/2016 | Underwood | H05K 3/00 428/35.9 |
| 2016/0116948 | A1* | 4/2016 | Ou | G06F 1/1613 361/679.56 |
| 2016/0192456 | A1 | 6/2016 | Su et al. | |
| 2016/0303828 | A1* | 10/2016 | Sriram | B32B 27/28 |
| 2017/0005414 | A1 | 1/2017 | Yang | |
| 2017/0346175 | A1* | 11/2017 | Zhao | B32B 3/266 |
| 2018/0287653 | A1 | 10/2018 | Li et al. | |

FOREIGN PATENT DOCUMENTS

| | | |
|---|---|---|
| CN | 104540341 A | 4/2015 |
| CN | 104646968 A | 5/2015 |
| CN | 104985750 A | 10/2015 |
| CN | 105306632 A | 2/2016 |
| CN | 105530788 A | 4/2016 |
| CN | 105657101 A | 6/2016 |
| CN | 105773905 A | 7/2016 |
| CN | 105792560 A | 7/2016 |
| CN | 105979741 A | 9/2016 |
| CN | 106132148 A | 11/2016 |
| CN | 106159132 A | 11/2016 |
| CN | 106816687 A | 6/2017 |
| CN | 106848538 A | 6/2017 |
| TW | 201702043 A | 1/2017 |
| WO | 2016101875 A1 | 6/2016 |

OTHER PUBLICATIONS

European search report, EP18741811, dated Dec. 11, 2019 (10 pages).
Anonymous: "CNC router—Wikipedia",Aug. 1, 2017, https://en.wikipedia.org/w/index.php?title=CNC_router&oldid=759039983(3 pages).
International search report,PCT/CN2018/072427, dated Mar. 29, 2018 (3 pages).
First Office Action from China patent office in a counterpart Chinese patent Application 201710031376.2, dated Oct. 23, 2018 (8 pages).

* cited by examiner

METHOD FOR MANUFACTURING HOUSING AND MOBILE TERMINAL

CROSS-REFERENCE TO RELATED APPLICATION(S)

The present application is a continuation-in-part application of International (PCT) Patent Application No. PCT/CN2018/072427 filed on Jan. 12, 2018, which claims priority to Chinese Patent Application No. 201710031376.2 filed on Jan. 17, 2017, the entire contents of both of which are hereby incorporated by reference in their entireties.

TECHNICAL FIELD

The present disclosure relates to the technical field of manufacturing processes of housings of mobile terminals, and in particular to a method for manufacturing a housing and a mobile terminal.

BACKGROUND

With the widely application of mobile phones, people have higher and higher requirements on appearance of housings of the mobile phones. Metal housings are becoming more and more popular with consumers due to the novel appearance. In order to prevent the metal housings from shielding antenna signals, a plurality of slots for antennas are generally defined in the metal housings to meet the requirements of radio frequencies of antennas. Besides, the slots for the antennas are filled with glue to connect metal portions on both sides of each slot of the antennas, in order to form complete housings of the mobile phones.

In the related art, if the slots are defined in the housings by directly cutting through the housings by means of milling, the housings may be easily deformed by forces during the milling process and subsequent processes, which results in a low yield of the housings and a high production cost.

SUMMARY

A method for manufacturing a housing is provided in the present disclosure. The method may include the following: roughening a first surface of the housing; placing the housing into a mold and performing an injection molding to form a plastic layer on the first surface and closely bonded to the housing; and defining a plurality of slots by cutting through the housing by means of milling without milling a part or all of the plastic layer, wherein the plastic layer is configured to keep a connecting portion between adjacent slots defined in the housing undeformed during the milling.

A mobile terminal may be further provided in the present disclosure. The mobile terminal may include any housing manufactured by the method for manufacturing the housing described above, a display assembly disposed on the housing, and a circuit disposed in the housing. The housing may include a first surface and a plastic layer closely bonded to the first surface. A plurality of slots are defined in the housing and extend through the housing without extending through the plastic layer by milling. The plastic layer is configured to keep a connecting portion between adjacent slots defined in the housing undeformed during the milling.

BRIEF DESCRIPTION OF DRAWINGS

In order to make the technical solution described in the embodiments of the present disclosure or the technical solution in the related art more clear, the drawings used for the description of the embodiments and the related art will be briefly described. Apparently, the drawings described below are only some embodiments of the present disclosure. It should be understood that, one skilled in the art may acquire other obvious modifications based on these drawings without any inventive effort.

DETAILED DESCRIPTION

Figure 1:
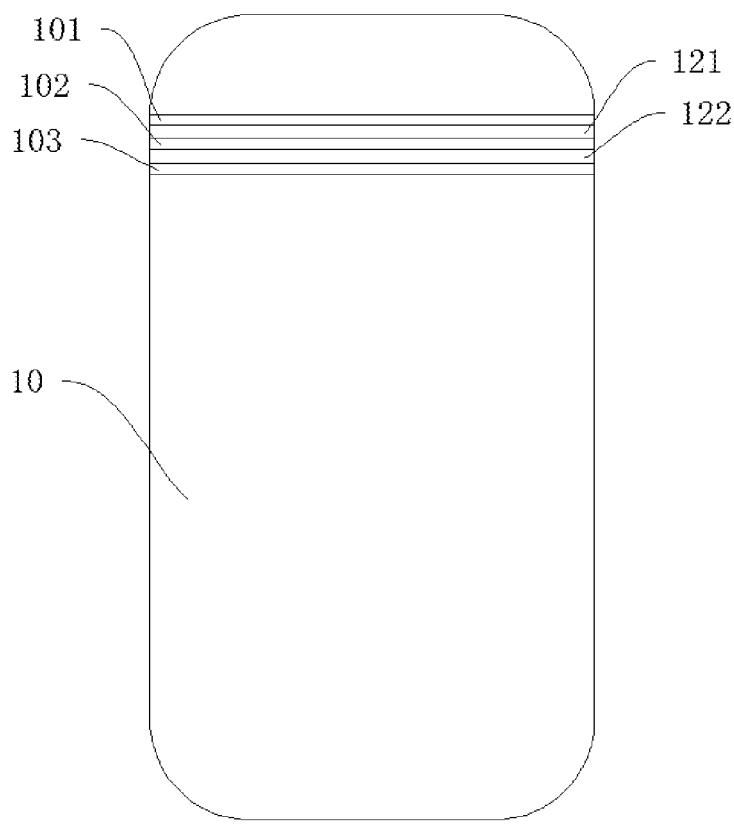
FIG. 1 illustrates a schematic structural view of a housing according to some embodiments of the present disclosure.

The technical solutions of embodiments of the present disclosure will be described clearly and completely with reference to the drawings of the embodiments of the present disclosure. Apparently, the embodiments described here are only some exemplary embodiments, not all the embodiments. Based on the embodiments described in the present disclosure, one skilled in the art may acquire all other embodiments without any creative effort. All these shall be covered within the protection scope of the present disclosure.

In one aspect, a method for manufacturing a housing is provided in the present disclosure. The method may include: roughening a first surface of the housing; placing the housing into a mold and performing an injection molding to form a plastic layer on the first surface and closely bonded to the housing; and defining a plurality of slots by cutting through the housing by means of milling without milling a part or all of the plastic layer, wherein the plastic layer is configured to keep a connecting portion between adjacent slots defined in the housing undeformed during the milling.

In some embodiments, defining the plurality of slots by cutting through the housing by means of milling further includes: milling an over-milled groove in the plastic layer, such that the plurality of slots completely cut through the housing.

In some embodiments, the over-milled groove has a depth of 0.1 mm to 0.3 mm.

In some embodiments, the first surface is roughened by a T treatment method or a mechanical processing method. The T treatment method may include: immersing the housing in alkali solution to clean the first surface and remove grease from the first surface; immersing the housing in acid solution to neutralize a pH of the first surface; immersing the housing in T solution to define a nano-sized pit on the first surface; placing the housing in water for washing; and drying the housing.

In some embodiments, the housing is immersed in the alkali solution for 1 minute, and the alkali solution is weak base at a pH of 9 to 10.

In some embodiments, the T solution contains lipoamino acid, and the lipoamino acid remains in the nano-sized pit after the T treatment method is finished. Performing the injection molding comprises: injecting plastic material on the housing; wherein an ester-amine chemical exothermic reaction occurs between the lipoamino acid and the plastic material.

In some embodiments, after defining the plurality of slots by cutting through the housing by means of milling, the method further includes: filling glue into the plurality of slots, wherein the glue fills up the plurality of slots in a self-leveling manner.

In some embodiments, after defining the plurality of slots by cutting through the housing by means of milling and before filling the glue into the plurality of slots, the method further includes: immersing the housing in alkali solution to clean the first surface and remove grease from an inner wall surface in each of the plurality of slots; immersing the housing in acid solution to neutralize a pH of the inner wall surface; immersing the housing in T solution containing lipoamino acid to define a nano-sized pit on the inner wall surface; wherein the pit has a diameter of 20~30 nm; placing the housing in water for washing; and drying the housing.

In some embodiments, after filling the glue into the plurality of slots, the method further comprises: baking the housing to cure the glue at a baking temperature of 120° C. for 30 minutes.

In some embodiments, before defining the plurality of slots by cutting through the housing by means of milling, the method further includes: cutting profile into a raw housing having a size of substantially equal to that of a single housing; performing a plurality of stamping operations on the raw housing to form a sheet for housing and having a uniform and equal thickness; machining the sheet by using a computer numerical control machine tool, and changing a thickness of the sheet to form the housing having unequal thicknesses in different parts of the housing.

In some embodiments, after filling the glue into the plurality of slots, the method further includes: machining the housing by using a computer numerically controlled machine tool to form an inner cavity and a periphery of the housing. After machining the housing by using the computer numerically controlled machine tool, the method further includes: polishing, sandblasting, and anodizing the housing to change a color and gloss of the housing.

In some embodiments, the glue is made of resin, and the housing is made of aluminum alloy material.

In another aspect, a method for manufacturing a housing is further provided in the present disclosure. The method may include: roughening a first surface of the housing by T treatment, such that a nano-sized pit is defined on the first surface; wherein lipoamino acid remains in the pit after the T treatment; placing the housing into a mold and injecting plastic material on the housing, such that an ester-amine chemical exothermic reaction occurs between the lipoamino acid and the plastic material, and a plastic layer closely bonded to the housing is formed on the first surface; and defining a plurality of slots by cutting through the housing by means of milling without milling a part or all of the plastic layer, wherein the plastic layer is configured to keep a connecting portion between adjacent slots defined in the housing undeformed during the milling.

In some embodiments, defining the plurality of slots by cutting through the housing by means of milling further comprises: milling an over-milled groove having a depth of 0.1 mm to 0.3 mm in the plastic layer, such that the plurality of slots completely cut through the housing.

In some embodiment, after defining the plurality of slots by cutting through the housing by means of milling, the method further includes: immersing the housing in alkali solution to clean the first surface and remove grease from an inner wall surface in each of the plurality of slots; immersing the housing in acid solution to neutralize a pH of the inner wall surface; immersing the housing in T solution containing lipoamino acid to define a nano-sized pit on the inner wall surface; wherein the pit has a diameter of 20~30 nm; placing the housing in water for washing; drying the housing; and filling glue into the plurality of slots, wherein the glue fills up the plurality of slots in a self-leveling manner.

In some embodiment, the housing is immersed in the alkali solution for 1 minute, and the alkali solution is weak base at a pH of 9 to 10.

A mobile terminal may be further provided in the present disclosure. The mobile terminal may include any housing manufactured by the method for manufacturing the housing described above, a display assembly disposed on the housing, and a circuit disposed in the housing. The housing may include a first surface and a plastic layer closely bonded to the first surface. A plurality of slots are defined in the housing and extend through the housing without extending through the plastic layer by milling. The plastic layer is configured to keep a connecting portion between adjacent slots defined in the housing undeformed during the milling.

In some embodiment, the plurality of slots comprises a first slot, a second slot, and a third slot; the first slot, the second slot, and the third slot are arranged in sequence and parallel to each other.

In some embodiment, each of the plurality of slots has a width of 0.3 mm~0.5 mm.

In some embodiment, a connecting portion between two adjacent slots has a width of 0.5 mm~1 mm, and the connecting portion is elongated.

In some embodiments of the present disclosure, a method for manufacturing a housing may be provided. The method may be used for manufacturing the housing for the mobile terminal. The housing may be configured as an external shell of the mobile terminal. The mobile terminal may further include a display assembly disposed on the housing and a circuit disposed in the housing. The mobile terminal may be implemented as a mobile phone, a tablet computer, a laptop, and the like.

The housing may be mounted on a back of the mobile terminal. On one hand, the housing may be configured to protect components (such as a main board, a battery, and the like) at an inner side of the mobile terminal. On the other hand, the housing may be further configured to beautify the structure of the mobile terminal, and attract eyes of consumers.

In some embodiments, the housing may be a metal housing. The metal housing may have a metallic texture and may be extremely attractive. In some embodiments, the metal housing may be made of aluminum alloy material. The aluminum alloy material is light in weight, difficult to oxidize, and easy to process.

Antenna signals inside the mobile terminal may be easily shielded by the metal housing. Thus, the metal housing needs to be cut through by milling to define a slot for an antenna in the housing, in order to allow communication signals to pass therethrough.

Based on the consideration of communication requirements of the mobile terminal and aesthetic appearance of the housing, in general, it is necessary to design a plurality of slots in the housing 10. The specific structure of the housing may be shown in FIG. 1. The housing 10 may include a plurality of slots for an antenna. In some embodiments, three slots for the antenna may be provided, and in other embodiments, other numbers of slots may also be provided. The slots may include a first slot 101, a second slot 102, and a third slot 103. The first slot 101, the second slot 102, and the third slot 103 may be arranged in sequence and parallel to each other. Each of the first slot 101, the second slot 102, and the third slot 103 may have a narrow width, and a width of a connecting portion between two adjacent slots is also narrow. Herein, the housing is made of metal, and the connecting portion is also made of metal, that is to say, the connecting portion may also be called as a metal portion. More specifically, each slot may have a width of 0.3 mm~0.5 mm, and the metal part may generally have a width of 0.5 mm~1 mm. In some embodiments, the connecting portion may be elongated. More specifically, the connecting portion between the first slot 101 and the second slot 102 may be a first metal strip 121, and the connecting portion between the second slot 102 and the third slot 103 may be a second metal strip 122. The widths of the first metal strip 121 and the second metal strip 122 are less than 1 mm, respectively, while the first metal strip 121 and the second metal strip 122 covers the entire housing 10 along the lengthwise direction of the first metal strip 121 and the second metal strip 122, and thus the connecting portion may have a low strength. During the process of defining the slot in the housing 10 by means of milling, the first metal strip 121 and the second metal strip 122 may be easily bent, deformed, and even broken by forces. Therefore, the process of defining the slot by cutting through the housing 10 by means of milling may further include the following.

Figure 2:
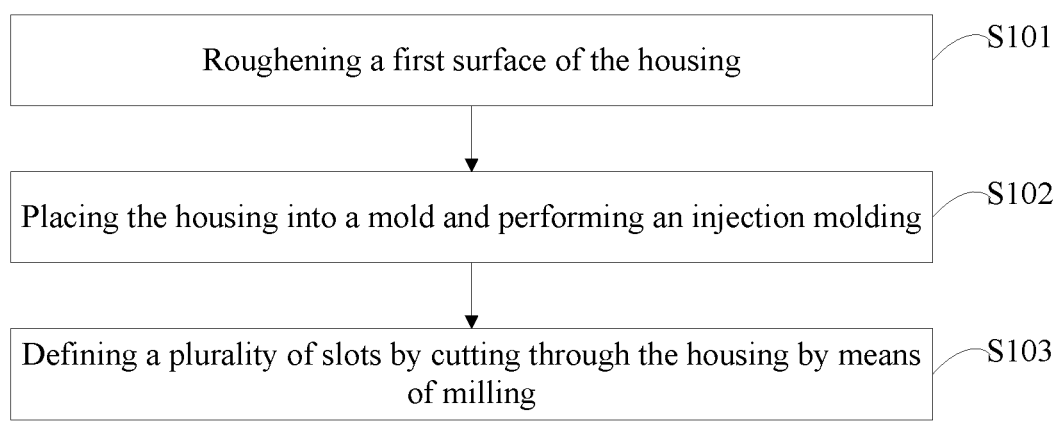
FIG. 2 illustrates a flow chart of a method for manufacturing the housing according to some embodiments of the present disclosure.

FIG. 2 is a flow chart of a method for manufacturing the housing 10 according to some embodiments of the present disclosure. As shown in the figure, the method for manufacturing the housing 10 may include the following blocks.

At block S101, a first surface 11 of the housing may be roughened.

Figure 3:
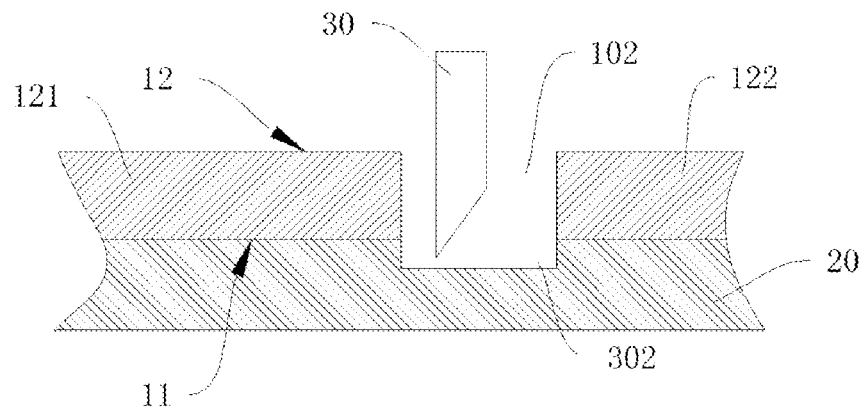
FIG. 3 illustrates a schematic structural view corresponding to block S103 of the method for manufacturing the housing according to some embodiments of present disclosure.

More specifically, as shown in FIG. 3, the housing 10 may include the first surface 11 and a second surface 12 opposite to each other. The first surface 11 is a surface of the finished housing that faces towards an inner cavity of the mobile terminal after the finished housing has been manufactured in subsequent processes (that is, an inner surface). The second surface 12 is a surface of the finished housing that faces away from the inner cavity of the mobile terminal after the finished housing has been manufactured in subsequent processes (that is, an outer surface). A T treatment may be performed to define a nano-sized pit on the first surface 11 of the housing 10 to roughen the first surface 11, such that the roughness of the first surface 11 may be increased, and it is convenient for subsequent injection molding performed on the first surface 11, and thus a firmly bonded plastic layer 20 may be formed on the first surface 11.

The first surface 11 may be roughened by means of the T treatment or a mechanical process. In some embodiments, the first surface 11 may be roughened by the T treatment. The T treatment is a processing technique that uses T solution to corrode the metal surface to form the nano-sized pit. The T treatment may be applied to a pretreatment of the metal surface, and belong to nano molding technology.

More specifically, the T treatment may include the following.

1. The housing 10 may be immersed in alkali solution, such that the first surface 11 may be cleaned and grease on the first surface 11 may be removed. In some embodiments, the alkali solution may be weak base at a pH of 9 to 10. The requirements of the cleanliness of the first surface 11 may be achieved by immersing the housing in the solution for one minute.

2. The housing 10 may be immersed in acid solution to neutralize the pH of the first surface 11.

3. The housing 10 may be immersed in the T solution to form a nano-sized pit on the first surface 11. More specifically, the T solution may contain a plurality of chemical agents, and lipoamino acid may be the main component of the T solution. After the housing 10 is immersed in the T solution, the first surface 11 may define the pit having a diameter of 20~30 nm, and the pit may be in shape of a coral reef. After the T treatment, the lipoamino acid may remain in the nano-sized pit in preparation for subsequent formation of the plastic layer 20 on the first surface 11.

4. The housing 10 may be placed in water for washing, and the chemical solution remaining in the housing 10 may be removed.

5. The housing 10 may be dried for subsequent use.

Further, the T treatment may be repeated a plurality of times to form the nano-sized pit, based on the material of the housing 10 and the corrosion resistance.

In this way, the housing 10 having a plurality of nano-sized pits defined on the first surface 11 may be obtained.

At block S102, the housing 10 may be placed in a mold and an injection molding may be performed.

More specifically, after being washed by water and further dried, the housing 10 may be clamped in the mold using a clamp, and the injection molding may be performed. In some embodiments, the plastic material for injection molding may be resin. The plastic material may enter the nano-sized pits on the first surface 11 to form the plastic layer 20 on the first surface 11. The plastic layer 20 may be closely bonded to the housing 10. More specifically, when the plastic material is integrally injected on the metal, an ester-amine chemical exothermic reaction may occur between the lipoamino acid and the plastic material. In this way, it is possible to delay the curing of the plastic material and facilitate the exchange of positions of the lipoamino acid and the plastic material, thereby ensuring that the plastic material may successfully enter into the nano-sized pits.

At block S103, the housing 10 may be cut through by means of milling to define a slot for the antenna.

In some embodiments, in the process of defining the slot for the antenna, only the housing 10 may be cut through by milling, and the plastic layer 20 may not be cut through by milling. Thus, the housing 10 may be supported by the plastic layer 20, such that the first metal strip 121 and the second metal strip 122 between the adjacent slots will not be bent or deformed during the milling process.

More specifically, combing with FIG. 3, the housing 10 may be placed on a machine table of a four-axis computer numerical control (CNC) machine having a rotary function. The first surface 11 may be placed on the machine table. A milling cutter 30 may be inserted to start milling the housing 10 from the surface of the housing 10 that is away from the plastic layer 20, that is, the second surface 12. The milling cutter 30 may finally pass out from the first surface 11, and an over-milled groove 302 may be milled in the plastic layer 20 to ensure that the slot for the antenna may completely cut through the housing 10. In some embodiments, the over-milled groove 302 may have a depth of 0.1 mm~0.3 mm.

The design of the over-milled slot 302 may ensure that the housing 10 is completely cut through by milling without cutting through the plastic layer 20 disposed on the first surface 11. Thus, the plastic layer 20 may still provide a support to the housing 10. In this way, it is possible to maintain the strength of the connecting portion between the adjacent slots, such that the connecting portion may not be bent, deformed, or even broken during the milling process, thereby increasing the yield of the housing 10 and reducing the production cost.

After the slot for the antenna has been cut through by milling in the housing 10, glue 40 needs to be filled in the slot to fill up the slot, in order to maintain the integrity of the housing 10 and provide a protection to the components such as the main board, the battery, and the like inside the mobile terminal by the housing 10.

In some embodiments, the glue 40 may be filled in the slot for the antenna by a four-axis dispenser, and the glue 40 may fill up the slot in a self-leveling manner. The process may be simple and easy to operate.

Further, an adhesion strength between the glue 40 and the metal housing 10 may be low, such that the structural stability requirements of the housing 10 cannot be met. Thus, the T treatment may needs to be performed on the housing 10, such that nano-sized pits may be defined on an inner wall surface 1010 of the formed slot, the inner wall surface 1010 may be roughened, and the adhesion between the inner wall surface 1010 and the glue 40 may be improved.

In other embodiments, filling the glue 40 may include the following.

At block 1, the inner wall surface 1010 of the housing 10 may be roughened.

In some embodiments, the inner wall surface 1010 may be roughened by the T treatment. The T treatment is a processing technique that uses T solution to corrode the metal surface to form the nano-sized pits. The T treatment may be applied to a pretreatment of the metal surface, and belong to nano molding technology.

More specifically, the T treatment may include the following.

1. The housing 10 may be immersed in alkali solution, such that the inner wall surface 1010 may be cleaned and grease on the inner wall surface 1010 may be removed. In some embodiments, the alkali solution may be weak base at a pH of 9 to 10. The requirements of the cleanliness of the inner wall surface 1010 may be achieved by immersing the housing in the solution for one minute.

2. The housing 10 may be immersed in acid solution to neutralize the pH of the inner wall surface 1010.

3. The housing 10 may be immersed in the T solution to form a nano-sized pit on the inner wall surface 1010. More specifically, the T solution may contain a plurality of chemical agents, and lipoamino acid may be the main component of the T solution. After the housing 10 is immersed in the T solution, the inner wall surface 1010 may define the pit having a diameter of 20~30 nm, and the pit may be in shape of a coral reef. After the T treatment, the lipoamino acid may remain in the nano-sized pit in preparation for subsequent formation of the glue 40 on the inner wall surface 1010.

4. The housing 10 may be placed in water for washing, and the chemical solution remaining in the housing 10 may be removed.

5. The housing 10 may be dried for subsequent use.

Further, the T treatment may be repeated a plurality of times to form the nano-sized pits, based on the material of the housing 10 and the corrosion resistance.

In this way, the housing 10 having a plurality of nano-sized pits defined on the inner wall surface 1010 may be obtained.

At block 2, the glue 40 may be filled into the slot.

Figure 4:
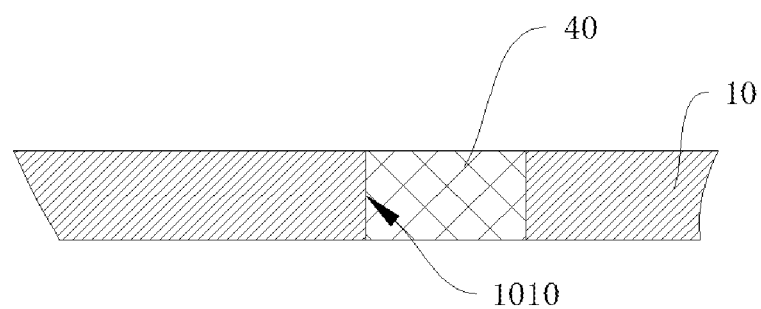
FIG. 4 illustrates a schematic structural view of the housing filled with glue by the method for manufacturing the housing according to some embodiments of present disclosure.

Combining with FIG. 4, more specifically, the glue 40 may be filled in the slot for the antenna by a four-axis dispenser, and the glue 40 may fill up the slot in a self-leveling manner. In some embodiments, the filled glue 40 may be resin. The glue 40 may enter the nano-sized pits defined on the inner wall surface 1010, and be closely bonded to the inner wall surface 1010. Further, an ester-amine chemical exothermic reaction may occur between the lipoamino acid and the glue 40. In this way, it is possible to delay the curing of the glue 40, facilitate the exchange of positions of the lipoamino acid and the glue 40, thereby ensuring that the glue 40 may successfully enter into the nano-sized pits. The glue 40 may be closely bonded to the inner wall surface 1010 of the slot. That is, the glue 40 may be closely bonded to the connecting portions on both sides of the slot. For example, the glue 40 in the second slot 102 may be closely bonded to the first metal strip 121 and the second metal strip 122. Thus, the housing 10 may have a high strength, the yield of the housing 10 may be increased, and the production cost may be reduced.

After the slot is filled up with the glue 40, the housing 10 may be baked to cure the glue 40. In some embodiments, the housing 10 may be baked at a baking temperature of 120° C. for 30 minutes.

After the T treatment, a plurality of nano-sized pits may be defined on the inner wall surface 1010 of the slot for the antenna, thereby increasing the roughness of the inner wall surface 1010, and effectively improving the bonding force between the glue 40 and the inner wall surface 1010. The glue 40 may be bonded to the connecting portions on both sides of the slot via the inner wall surface 1010. Therefore, it is possible to increase the adhesion between the glue 40 and the connecting portions on both sides of the slot. Thus, the housing 10 may have a high strength, the yield of the housing 10 may be increased, and the production cost may be reduced.

In some embodiments, the housing 10 may be initially made of an aluminum alloy profile. More specifically, before the housing 10 is cut through by milling to form the slot, the method for manufacturing the housing 10 provided in some embodiments of the present disclosure may further include the followings.

1. The aluminum alloy profile may be cut into a raw housing having a size of a single housing 10, that is to say, the raw housing may have a size substantially equal to that of a single housing 10.

In some embodiment, this process may be implemented using a numerically controlled machine tool, and the specific size of the housing 10 may be determined based on the size of the mobile terminal.

2. A plurality of stamping operations may be performed to the raw housing to form a sheet for the housing having a uniform and equal thickness.

In some embodiments, the process may be performed using a stamping machine to form the sheet having a uniform thickness for subsequent processing.

3. The sheet may be machined by using the numerically controlled machine tool, and a thickness of the sheet may be changed to form the housing 10 having unequal thicknesses in different part of the housing.

In some embodiments, the first surface 11 of the housing 10 may be placed on a fixture, and metal processes, including lathing, milling, grinding, cutting, and the like, may be performed on the second surface 12, such that the thicknesses of each part of the sheet may be changed. Thus, a prototype of the structure of the housing 10 may be formed.

Through the above processing process, the prototype of the structure of the housing 10 may be formed, and the processing process may be simple and easy to operate, which may facilitate subsequent processing of the slot of the antenna.

In some embodiments, after the glue 40 has been filled in the slot, the housing needs to be machined by finish machining to form a finished product of the housing. More specifically, after the glue 40 has been filled in the slot, the method for manufacturing the housing 10 provided in some embodiments of the present disclosure may further include the following.

1. The housing 10 may be machined by using the numerically controlled machine tool to form the inner cavity, a periphery and detail features of the housing 10.

More specifically, the inner cavity, the peripheral and detail features of the housing 10 may be determined by the functions of the mobile terminal. The detailed features may include a receiving hole for receiving a camera, a headphone jack, a power line hole, and the like.

Further, since the slot for the antenna has been filled with the glue 40 which is closely bonded to the connecting portion of the housing 10, the glue 40 which is cured during the process may ensure the tolerance of the width of the slot.

2. The housing 10 may be polished, sandblasted, and anodized to change the color and gloss of the housing 10, such that a finished housing may be formed.

More specifically, the plastic layer 20 disposed on the first surface 11 may be removed during the polishing process, and the appearance of the housing 10 may be beautified by sandblasting and anodization to achieve the decorative effect.

When defining a plurality of slots in the housing 10 by milling, the plastic layer 20 disposed on the first surface 11 may support the housing 10, and the connecting portion between the adjacent slots may not be deformed during the milling process, thereby increasing the yield of the housing 10 and reducing the production cost.

Figure 5:
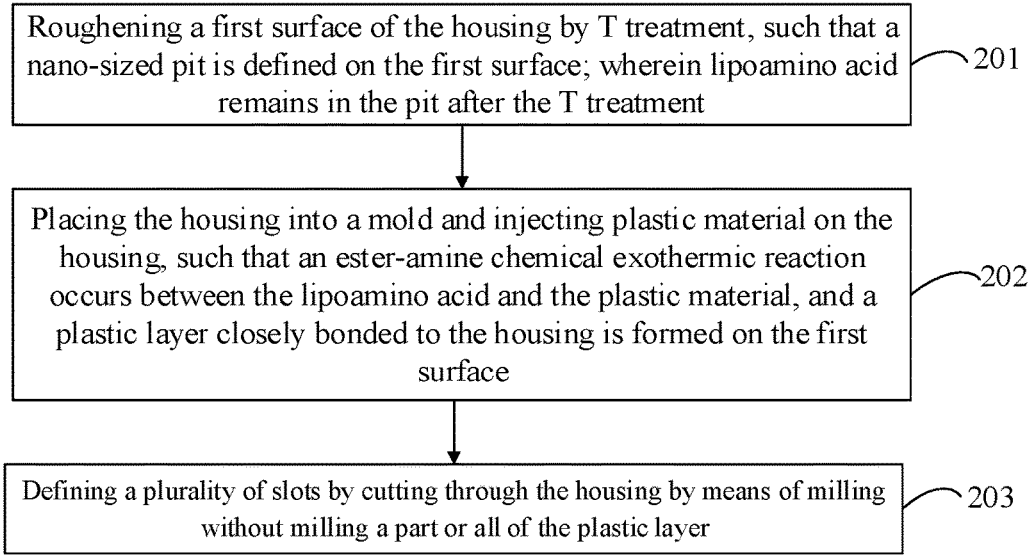
FIG. 5 illustrates another flow chart of a method for manufacturing the housing according to some embodiments of the present disclosure.

FIG. 5 illustrates another flow chart of a method for manufacturing the housing according to some embodiments of the present disclosure. As shown in FIG. 5, the method may include the following blocks.

At block 201, a first surface of the housing may be roughened by T treatment, such that a nano-sized pit is defined on the first surface. In some embodiments, ipoamino acid remains in the pit after the T treatment. Herein, the process of the T treatment may refer to that described in block S101.

At block 202, the housing may be placed into a mold and injecting plastic material on the housing, such that an ester-amine chemical exothermic reaction occurs between the lipoamino acid and the plastic material, and a plastic layer closely bonded to the housing is formed on the first surface.

At block 203, a plurality of slots may be defined in the housing by cutting through the housing by means of milling without milling a part or all of the plastic layer. The plastic layer is configured to keep a connecting portion between adjacent slots defined in the housing undeformed during the milling.

Figure 6:
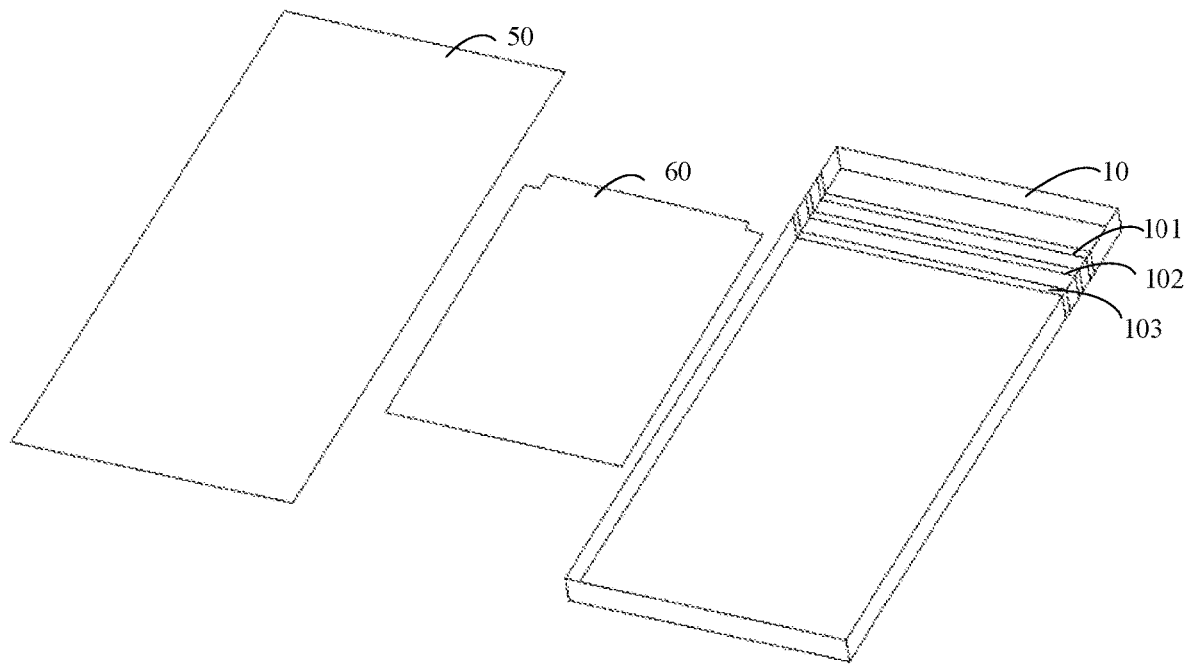
FIG. 6 illustrates a schematic structural view of a mobile terminal according to some embodiments of present disclosure.

A mobile terminal may also be provided in some embodiments of the present disclosure. As shown in FIG. 6, the mobile terminal may include the aforementioned housing 10, a display assembly 50 disposed on the housing 10, and a circuit 60 disposed in the housing 10. The mobile terminal may refer to a computer device that may be used on the move, and may include but be not limited to a mobile phone, a notebook, a tablet computer, a Point of Sale (POS) device, an in-vehicle computer, a camera, and the like.

The above disclosure is only a few preferred embodiments of the present disclosure, and of course, the scope of the present disclosure cannot be limited thereto. One skilled in the art may understand all or part of the process for implementing the above embodiments, and make equivalent changes based on the claims of the present disclosure All these shall all be covered within the protection scope of the present disclosure.

What is claimed is:

1. A method for manufacturing a housing, comprising:
   roughening a first surface of the housing;
   placing the housing into a mold and performing an injection molding to form a plastic layer on the first surface and closely bonded to the housing; and
   defining a plurality of slots by cutting through the housing by means of milling without milling a part or all of the plastic layer, wherein the plastic layer is configured to keep a connecting portion between adjacent slots defined in the housing undeformed during the milling;
   wherein the first surface is roughened by a T treatment method, and the T treatment method comprises:
   immersing the housing in alkali solution to clean the first surface and remove grease from the first surface;
   immersing the housing in acid solution to neutralize a pH of the first surface;
   immersing the housing in T solution to define a nano-sized pit on the first surface;
   placing the housing in water for washing; and
   drying the housing;
   wherein the T solution contains lipoamino acid, and the lipoamino acid remains in the nano-sized pit after the T treatment method is finished;
   wherein performing the injection molding comprises: injecting plastic material on the housing; wherein an ester-amine chemical exothermic reaction occurs between the lipoamino acid and the plastic material.

2. The method according to claim 1, wherein defining the plurality of slots by cutting through the housing by means of milling further comprises: milling an over-milled groove in the plastic layer, such that the plurality of slots completely cut through the housing.

3. The method according to claim 2, wherein the over-milled groove has a depth of 0.1 mm to 0.3 mm.

4. The method according to claim 1, wherein the housing is immersed in the alkali solution for 1 minute, and the alkali solution is weak base at a pH of 9 to 10.

5. The method according to claim 1, further comprising:
   after defining the plurality of slots by cutting through the housing by means of milling: filling glue into the plurality of slots, wherein the glue fills up the plurality of slots in a self-leveling manner.

6. The method according to claim 5, further comprising:
   after defining the plurality of slots by cutting through the housing by means of milling and before filling the glue into the plurality of slots:
   immersing the housing in alkali solution to clean the first surface and remove grease from an inner wall surface in each of the plurality of slots;
   immersing the housing in acid solution to neutralize a pH of the inner wall surface;
   immersing the housing in T solution containing lipoamino acid to define a nano-sized pit on the inner wall surface; wherein the pit has a diameter of 20~30 nm;
   placing the housing in water for washing; and
   drying the housing.

7. The method according to claim 5, further comprising:
after filling the glue into the plurality of slots, baking the housing to cure the glue at a baking temperature of 120° C. for 30 minutes.

8. The method according to claim 5, further comprising:
after filling the glue into the plurality of slots, machining the housing by using a computer numerically controlled machine tool to form an inner cavity and a periphery of the housing; and
after machining the housing by using the computer numerically controlled machine tool, polishing, sandblasting, and anodizing the housing to change a color and gloss of the housing.

9. The method according to claim 5, wherein the glue is made of resin, and the housing is made of aluminum alloy material.

10. The method according to claim 5, wherein the plurality of slots comprises a first slot, a second slot, and a third slot; the first slot, the second slot, and the third slot are arranged in sequence and parallel to each other.

11. The method according to claim 10, wherein each of the plurality of slots has a width of 0.3 mm~0.5 mm.

12. The method according to claim 1, further comprising:
before defining the plurality of slots by cutting through the housing by means of milling:
cutting profile into a raw housing having a size of substantially equal to that of a single housing;
performing a plurality of stamping operations on the raw housing to form a sheet for housing and having a uniform and equal thickness; and
machining the sheet by using a computer numerical control machine tool, and changing a thickness of the sheet to form the housing having unequal thicknesses in different parts of the housing.

13. The method according to claim 1, further comprising:
polishing the housing and removing the plastic layer disposed on the first surface during the polishing process, and forming a decoration layer on a second surface by sandblasting and anodizing the housing after the polishing process.

14. The method according to claim 1, wherein a metal portion is arranged between every two adjacent slots, and the metal portion has a width of 0.5 mm~1 mm.

* * * * *